United States Patent
Dudar

(12) 
(10) Patent No.: US 12,169,158 B2
(45) Date of Patent: Dec. 17, 2024

(54) METHODS AND SYSTEMS FOR FUEL SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 17/658,397

(22) Filed: Apr. 7, 2022

(65) Prior Publication Data

US 2023/0324251 A1 Oct. 12, 2023

(51) Int. Cl.
| | | |
|---|---|---|
| G01M 3/26 | (2006.01) | |
| G01G 19/08 | (2006.01) | |
| G01K 3/00 | (2006.01) | |
| G07C 5/08 | (2006.01) | |
| F02D 41/22 | (2006.01) | |

(52) U.S. Cl.
CPC .............. *G01M 3/26* (2013.01); *G01G 19/08* (2013.01); *G01K 3/005* (2013.01); *G07C 5/0808* (2013.01); *F02D 2041/225* (2013.01); *F02M 2700/05* (2013.01)

(58) Field of Classification Search
None
See application file for complete search history.

(56) References Cited

U.S. PATENT DOCUMENTS

| 8,074,627 | B2 | 12/2011 | Siddiqui | |
|---|---|---|---|---|
| 10,850,587 | B2 | 12/2020 | Dudar | |
| 2010/0114437 | A1 | 5/2010 | Boss et al. | |
| 2013/0075181 | A1* | 3/2013 | Ashida | B62J 37/00 180/230 |
| 2017/0292475 | A1* | 10/2017 | Dudar | F02M 25/089 |
| 2018/0072152 | A1* | 3/2018 | Dudar | B67D 7/0492 |
| 2018/0171909 | A1* | 6/2018 | Richards | F02D 41/021 |
| 2018/0179993 | A1* | 6/2018 | Dudar | F02M 25/0836 |
| 2019/0285020 | A1* | 9/2019 | Dudar | F02M 65/003 |

OTHER PUBLICATIONS

"F-150 Adds Class-Exclusive Tech With Onboard Scales to Simplify Loading and Trailering, Active Suspension for Greater Confidence," Ford Media Center Website, Available Online at https://media.ford.com/content/fordmedia/fna/us/en/news/2021/04/28/f-150-adds-class-exclusive-tech-with-onboard-scales-to-simplify-.html, Apr. 28, 2021, 3 pages.

* cited by examiner

*Primary Examiner* — Jill E Culler
*Assistant Examiner* — Ruben C Parco, Jr.
(74) *Attorney, Agent, or Firm* — Vincent Mastrogiacomo; McCoy Russell LLP

(57) ABSTRACT

Methods and systems are provided for a fuel system. In one example, a method includes adjusting a threshold of a diagnostic based on a distance between a fuel tank and a ground surface. The distance is inferred based on a vehicle weight.

15 Claims, 6 Drawing Sheets

METHODS AND SYSTEMS FOR FUEL SYSTEM

FIELD

The present description relates generally to adjusting a diagnostic threshold for a fuel system in response to ambient conditions.

BACKGROUND/SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere.

Evaporative leaks may be identified using engine-off natural vacuum (EONV) during key-off conditions when a vehicle engine is not operating. Therein, correlations between temperature and vacuum build-up are advantageously used to detect fuel system leaks. In particular, a fuel system is isolated at key-off, and as a fuel tank cools down, a vacuum is generated therein. Vacuum generation is monitored over a long time, and based on a rate of subsequent vacuum bleed-up, a leak can be identified. Another approach for leak detection during key-off conditions is shown by Siddiqui in U.S. Pat. No. 8,074,627. Therein, a fuel pump is operated to store vacuum in an accumulator. The stored vacuum is then applied on the fuel system during a key-off condition to identify a leak.

The inventors herein have identified a potential issue with such approaches. In these approaches, temperature (of the fuel tank) is not only a control factor but also a noise factor. For example, the EONV approaches rely on a correlation between fuel tank temperature and pressure to generate and apply vacuum on the fuel tank. However, depending on how long a vehicle engine was on before the leak test was initiated (which affects how much heat was rejected from the running engine to the fuel tank), a temperature of the parking surface where the vehicle is parked, as well as wind and sun loading on the fuel system, leak test results may vary. The same factors may likewise corrupt pressure data collected in the approach of Siddiqui. Consequently, in either approach, false failures or false passes may occur, degrading exhaust emissions. The problem may be exacerbated in hybrid vehicles where engine run times are low such that heat rejection to the fuel tank during engine operation is also low. Consequently, a temperature decrease in the fuel tank during the key-off may not be enough to generate sufficient EONV for a leak test.

In one example, the issues described above may be addressed by a method for adjusting a threshold of a diagnostic based on an inferred distance between a fuel tank and a ground surface. In this way, an accuracy of the diagnostic may be enhanced by accounting for the distance between the fuel tank and a hot ground surface, which may impact fuel tank temperature and pressure changes.

As one example, the threshold may be a threshold pressure, wherein the threshold pressure is increased based on the distance decreasing and the ground surface being hotter than an ambient air temperature. As another example, the threshold may be a threshold vacuum, wherein the threshold vacuum is decreased based on the distance decreasing and the ground surface being hotter than the ambient air temperature. By doing this, an accuracy of results of the diagnostic may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
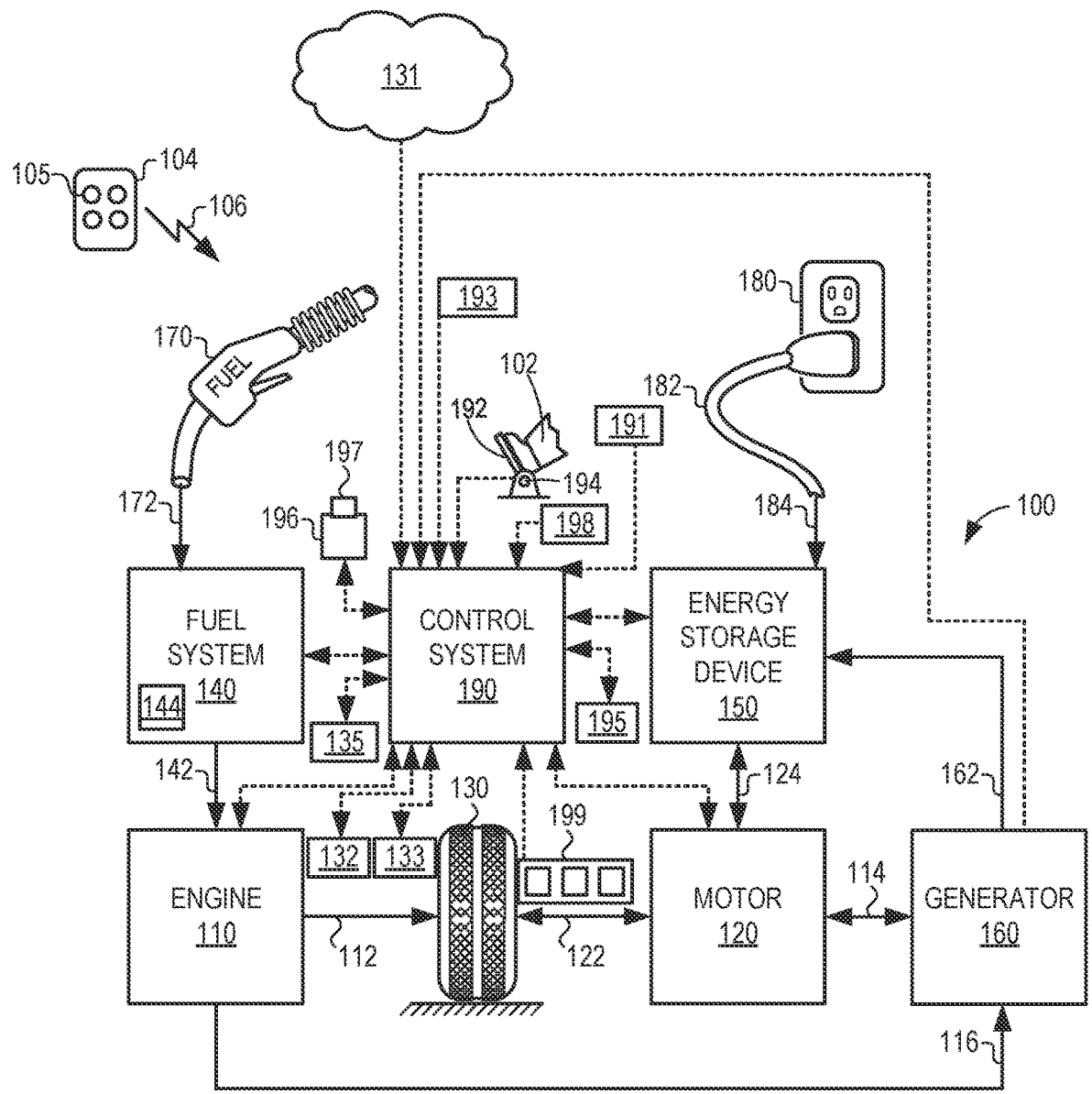
FIG. 1 illustrates a schematic of an engine included in a hybrid vehicle.
Figure 2:
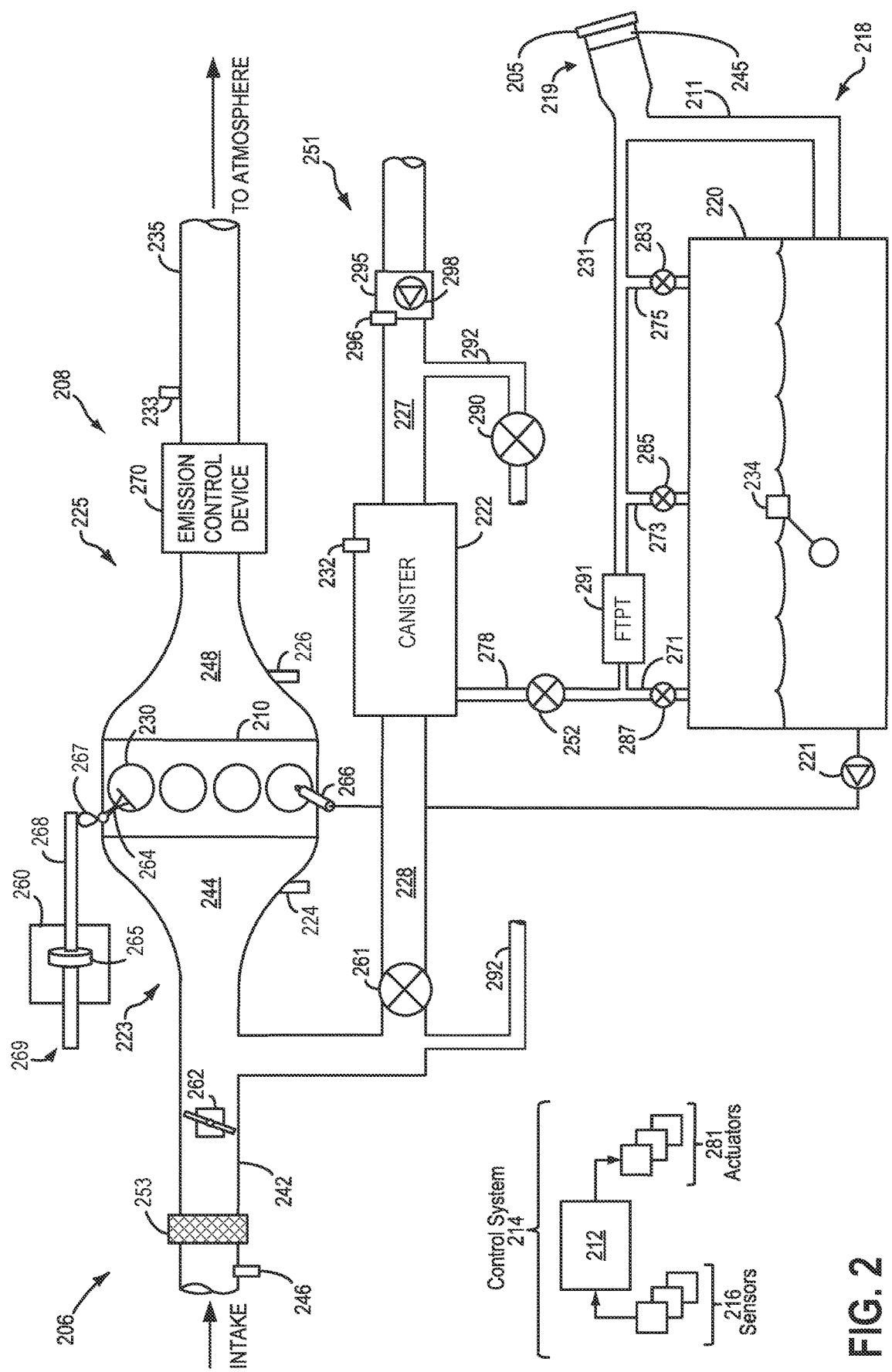
FIG. 2 illustrates a schematic of a fuel system of the engine.
Figure 3:
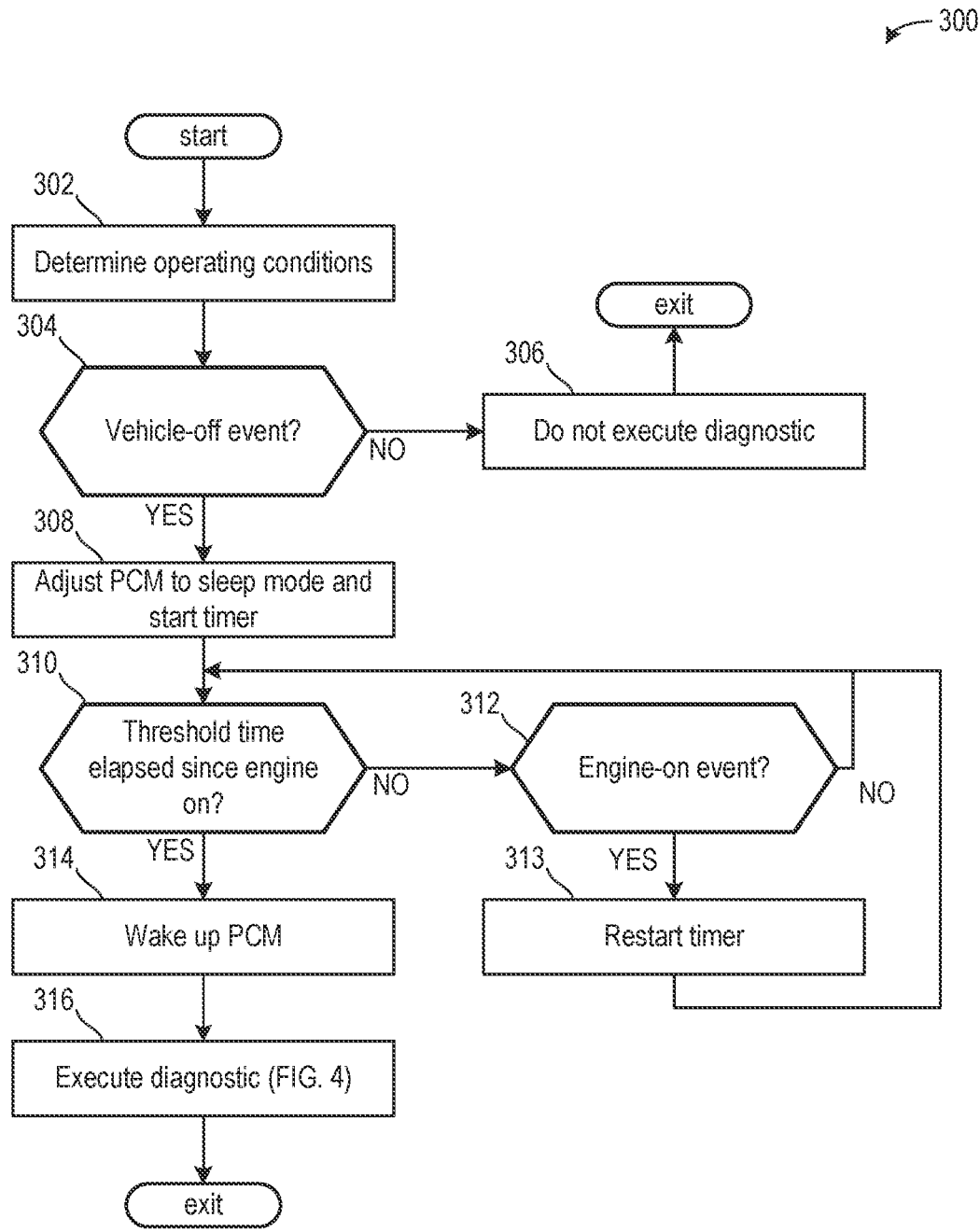
FIG. 3 illustrates a method for determining if a vehicle-off leak test conditions are met.
Figure 4:
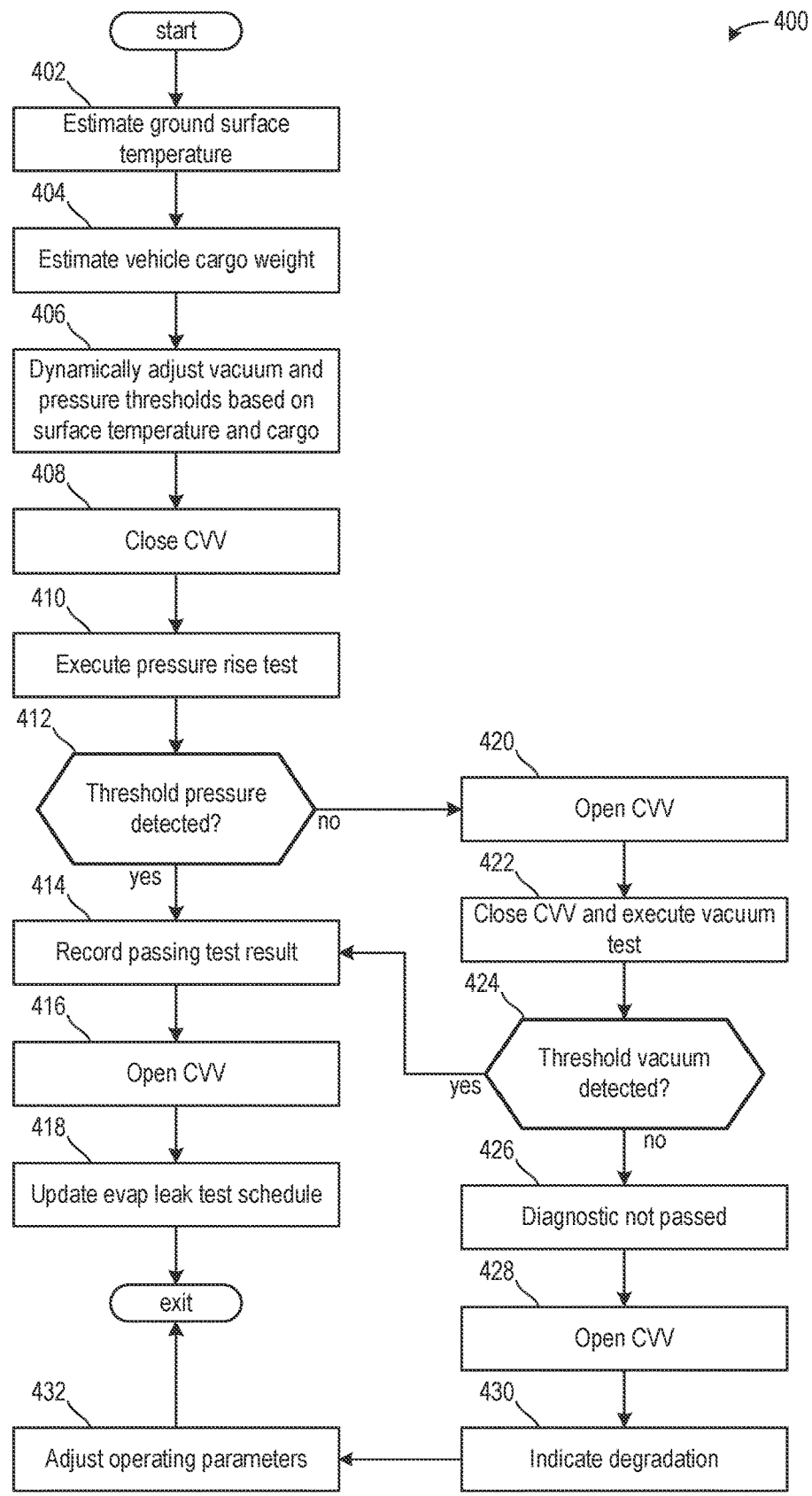
FIG. 4 illustrates a method for operating the vehicle-off leak test and adjusting thresholds thereof based on a ground surface temperature and cargo load.
Figure 6:
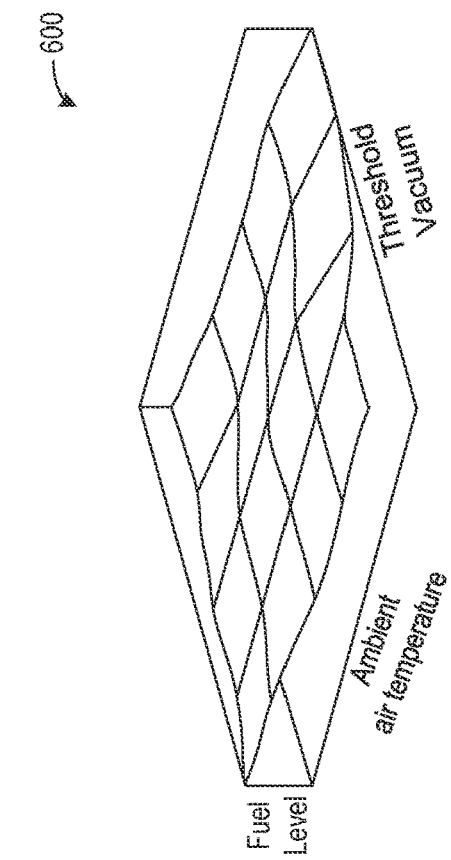
FIG. 6 illustrates a plot for adjusting a threshold vacuum of the vehicle-off leak test.
Figure 5:
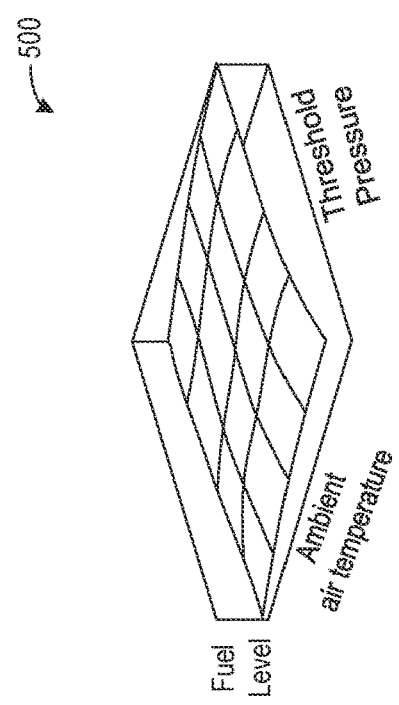
FIG. 5 illustrates a plot for adjusting a threshold pressure of the vehicle-off leak test.
Figure 7:
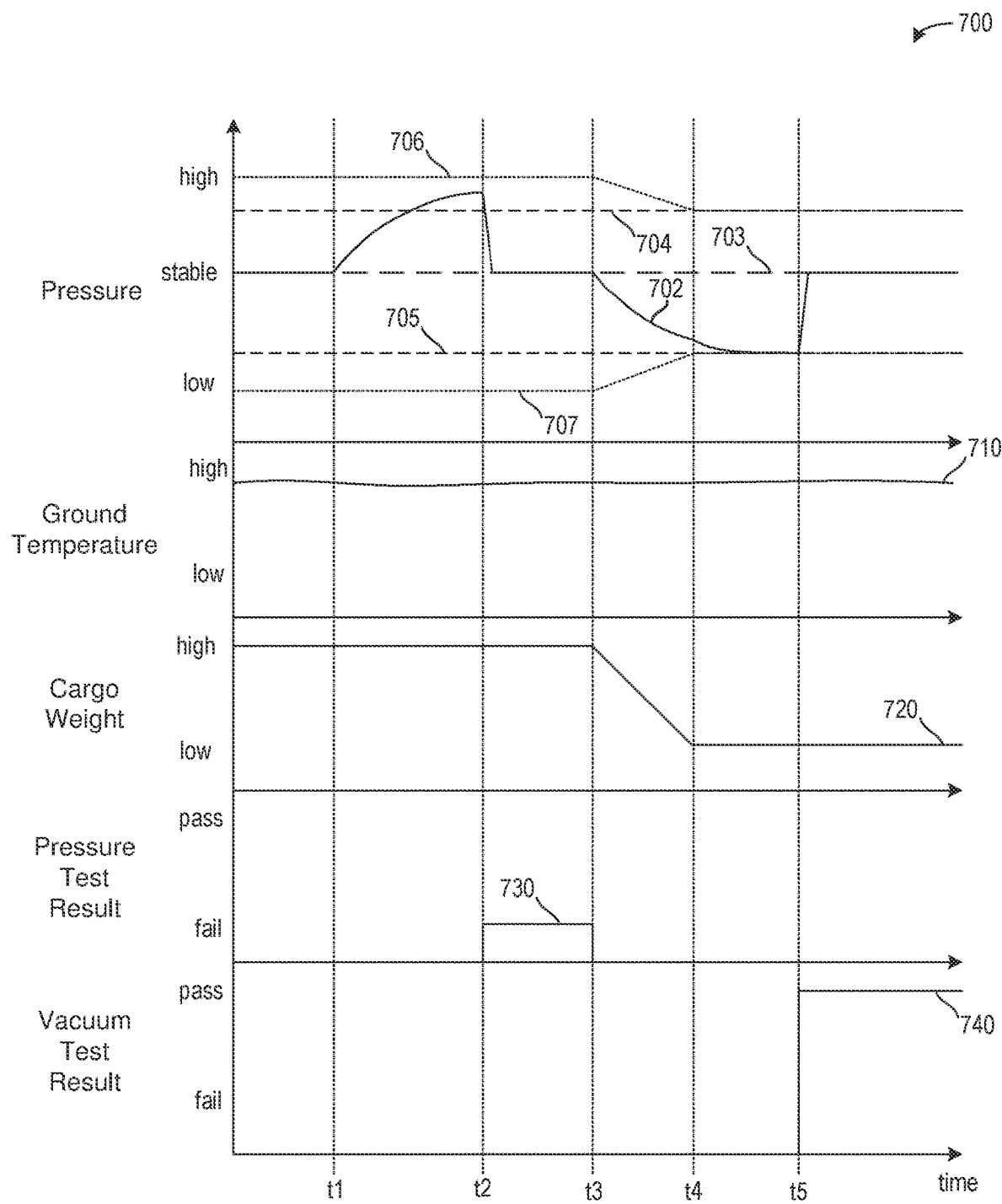
FIG. 7 illustrates an engine operating sequence illustrating the diagnostic being executed.

The following description relates to systems and methods for identifying leaks in a fuel system coupled to an engine in a vehicle, such as a hybrid vehicle of FIG. 1. The fuel system coupled to an engine, as shown in FIG. 2. A method for determining if a vehicle-off leak test conditions are met is shown in FIG. 3. A method for operating the vehicle-off leak test and adjusting thresholds thereof based on a ground surface temperature and cargo load is shown in FIG. 4. A plot for adjusting a threshold pressure of the vehicle-off leak test is shown in FIG. 5. A plot for adjusting a threshold vacuum of the vehicle-off leak test is shown in FIG. 6. FIG. 7 illustrates an engine operating sequence illustrating the diagnostic being executed.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be automatically actuated or pressed by a vehicle operator to initiate refueling. For example, in response to the vehicle operator actuating refueling button 197, a fuel tank in the vehicle may be depressurized so that refueling may be performed.

The vehicle propulsion system 100 may further include an onboard vehicle weight sensor 193. The vehicle weight sensor 193 may be configured to sense a total weight of the vehicle. A load sensor 191 may be coupled to the control system 190. The load sensor 191 may be positioned in a vehicle hitch and configured to sense a weight of a trailer load.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example. In one example, the onboard cameras 135 include at least a rear camera, which may be positioned to image behind the vehicle as well as a ground surface on which the vehicle is positioned.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In some examples, vehicle system 100 may include lasers, radar, sonar, acoustic sensors 133, which may enable vehicle location, traffic information, etc., to be collected via the vehicle.

The vehicle system 100 may be in wireless communication with a wireless network 131. The control system 190 may communicate with the wireless network 131 via a modem, a router, a radio signal, or the like. Data regarding various vehicle system conditions may be communicated between the control system 190 and the wireless network. Additionally or alternatively, the wireless network 131 may communicate conditions of other vehicles to the control system 190.

FIG. 2 shows a schematic depiction of a vehicle system 206. The vehicle system 206 includes an engine system 208 coupled to an evaporative emissions control system 251 and a fuel system 218. Evaporative emissions control system 251 (also termed, evaporative emissions system 251) includes a fuel vapor container or fuel system canister 222 which may be used to capture and store fuel vapors. In some examples, vehicle system 206 may be a hybrid electric vehicle system, such as the vehicle propulsion system 100 of FIG. 1. As such, engine 210 may be similar to engine 110 of FIG. 1 while control system 214 of FIG. 2 may be the same as control system 190 of FIG. 1.

The engine system 208 may include an engine 210 having a plurality of cylinders 230. The engine 210 includes an engine intake 223 and an engine exhaust 225. The engine intake 223 includes a throttle 262 fluidly coupled to the intake manifold 244. Fresh intake air enters intake passage 242 and flows through air filter 253. Air filter 253 positioned in the intake passage 242 may clean intake air before the intake air is directed to the intake manifold 244. Cleaned intake air exiting the air filter 253 may stream past throttle 262 (also termed intake throttle 262) into intake manifold 244 via intake passage 242. As such, intake throttle 262 when fully opened may enable a higher level of fluidic communication between intake manifold 244 and intake passage 242 downstream of air filter 253. An amount of intake air provided to the intake manifold 244 may be regulated via throttle 262 based on engine conditions. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Each cylinder 230 may be serviced by one or more valves. In the present example, each cylinder 230 includes a corresponding intake valve 264 and an exhaust valve (not shown). Each intake valve 264 may be held at a desired position via a corresponding spring. Engine system 208 further includes one or more camshafts 268 for operating intake valve 264. In the depicted example, intake camshaft 268 is coupled to intake valve 264 and can be actuated to operate intake valve 264. In some embodiments, where the intake valve of a plurality of cylinders 230 are coupled to a common camshaft, intake camshaft 268 can be actuated to operate all the intake valves of all the coupled cylinders.

Intake valve 264 is actuatable between an open position that allows intake air into the corresponding cylinder and a closed position substantially blocking intake air from the cylinder. Intake camshaft 268 may be included in intake valve actuation system 269. Intake camshaft 268 includes intake cam 267 which has a cam lobe profile for opening intake valve 264 for a defined intake duration. The lobe profile may affect cam lift height, cam duration, and/or cam timing. A controller, such as controller 212, may be able to switch the intake valve duration by moving intake camshaft 268 longitudinally and switching between cam profiles.

It will be appreciated that the intake and/or exhaust camshafts may be coupled to cylinder subsets, and multiple intake and/or exhaust camshafts may be present. Intake valve actuation system 269 may further include push rods, rocker arms, tappets, etc. As such, the intake valve actuation system may include a plurality of electromechanical actuators. Such devices and features may control actuation of the intake valve 264 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 230 may each have more than one intake valve. In still other examples, each intake valve 264 of one or more cylinders may be actuated by a common camshaft. Further still, in some examples, some of the intake valves 264 may be actuated by their own independent camshaft or other device.

Engine system 208 may include variable valve timing systems, for example, variable cam timing VCT system 260. As such, VCT system 260 may be operatively and communicatively coupled to the intake valve actuation system 269. VCT system 260 may include an intake camshaft phaser 265 coupled to the common intake camshaft 268 for changing intake valve timing. VCT system 260 may be configured to advance or retard valve timing by advancing or retarding cam timing and may be controlled by controller 212. In some embodiments, valve timing such as intake valve closing (IVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 260. As such, the valve actuation systems described above may enable closing the intake valves to block fluid flow therethrough, when desired.

Though not shown in FIG. 2, vehicle system 206 may also include an exhaust gas recirculation (EGR) system for routing a desired portion of exhaust gas from the exhaust passage 235 to the intake manifold 244 via an EGR passage. The amount of EGR provided may be varied by controller 212 via adjusting an EGR valve in the EGR passage. By introducing exhaust gas to the engine 210, the amount of available oxygen for combustion is decreased, thereby reducing combustion flame temperatures and reducing the formation of NOx, for example.

Fuel system 218 may include a fuel tank 220 coupled to a fuel pump system 221. The fuel pump system 221 may include one or more pumps for pressurizing fuel delivered to the injectors of engine 210, such as the example injector 266. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to evaporative emissions control system 251, which includes a fuel vapor canister 222, via vapor recovery line 231. The fuel vapor canister 222 may also be simply termed canister 222 herein. Fuel vapors stored in fuel vapor canister 222 may be purged to the engine intake 223 at a later time. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219 (or refueling system 219). In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Evaporative emissions control system 251 may include one or more emissions control devices, such as one or more fuel vapor canisters 222 (also termed, canister 222) filled with an appropriate adsorbent. The canisters are configured to temporarily trap fuel vapors (including vaporized hydrocarbons) during fuel tank refilling operations and "running loss" (that is, fuel vaporized during vehicle operation). In one example, the adsorbent used is activated charcoal. Evaporative emissions system 251 may further include a canister ventilation path or vent line 227 which may route gases out of the canister 222 to the atmosphere when storing, or trapping, fuel vapors from fuel system 218.

Vent line 227 may allow fresh air to be drawn into canister 222 when purging stored fuel vapors from canister 222 to engine intake 223 via purge line 228 and canister purge valve 261 (also termed, purge valve 261). For example, purge valve 261 may be normally closed but may be opened during certain conditions so that vacuum from engine intake manifold 244 is provided to the fuel vapor canister 222 for purging.

FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may be stored within canister 222 and air, stripped off fuel vapors, may then be vented to atmosphere via vent line 227. Fuel vapors stored in fuel vapor canister 222 may be purged along purge line 228 to engine intake 223 via canister purge valve 261 at a later time when purging conditions exist. As such, FTIV 252 when closed may isolate and seal the fuel tank 220 from the evaporative emissions system 251. It will be noted that certain vehicle systems may not include FTIV 252.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open FTIV 252 while closing canister purge valve (CPV) 261 to direct refueling vapors into canister 222 and preventing fuel vapors from being directed into the intake manifold.

As another example, the fuel system may be operated in a refueling mode (e.g., when fuel tank refueling is requested by a vehicle operator), wherein the controller 212 may open FTIV 252, while maintaining CPV 261 closed, to depressurize the fuel tank before allowing fuel to be added therein. As such, FTIV 252 may be kept open during the refueling operation to allow refueling vapors to be stored in the canister. After refueling is completed, the FTIV 252 may be closed.

As yet another example, the fuel system may be operated in a canister purging mode (e.g., after an emission control device light-off temperature has been attained and with the engine running), wherein the controller 212 may open CPV 261 while closing FTIV 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. The FTIV 252 may be closed during the purging mode.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include manifold absolute pressure (MAP) sensor 224, barometric pressure (BP) sensor 246, exhaust gas sensor 226 located in exhaust manifold 248 upstream of the emission control device, temperature sensor 233, fuel tank pressure sensor 291 (also termed a fuel tank pressure transducer or FTPT), and canister temperature sensor 232. Other sensors such as pressure, temperature, air/fuel ratio, and composition sensors may be coupled to various locations in the vehicle system 206. As another example, the actuators may include CPV 261, fuel injector 266, throttle 262, FTIV 252, fuel pump 221, and refueling lock 245. The control system 214 may include a controller 212. The controller may receive input data from the various sensors, process the input data, and trigger the actuators in response to the processed input data based on instruction or code programmed therein corresponding to one or more routines.

The controller 212 receives signals from the various sensors of FIG. 2 and employs the various actuators of FIG. 2 to adjust engine operation based on the received signals and instructions stored on a memory of the controller. For example, adjusting the canister purge valve may include adjusting an actuator of the canister purge valve to adjust a flow rate of fuel vapors therethrough. As such, controller 212 may communicate a signal to the actuator (e.g., canister purge valve solenoid) of the canister purge valve based on a desired purge flow rate. Accordingly, the canister purge valve solenoid may be opened (and pulsed) at a specific duty cycle to enable a flow of stored vapors from canister 222 to intake manifold 244 via purge line 228.

Leak detection routines may be intermittently performed by controller 212 on evaporative emissions system 251 and fuel system 218 to confirm that the fuel system is not degraded. In one example, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump.

Turning now to FIG. 3, it shows a method 300 for determining if a leak diagnostic is desired. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302, which includes determining, estimating, and/or measuring current operating parameters. Current operating parameters may include, but are not limited to, one or more of a throttle position, an engine temperature, an engine speed, a vehicle speed, a manifold vacuum, and an air/fuel ratio.

At 304, the method 300 may include determining if a vehicle-off event is present. The vehicle-off event may be present if a key-off condition is initiated, which may include an active key being turned in the ignition to an off position, a stop button actuated if the vehicle includes a start/stop button, a passive key being initiated (e.g, start/stop), and a remote key being initiated. The remote key may be initiated through a key fob, a cellular device, or other remote device.

If the vehicle-off event is not present, then at 306, the method 300 may include not executing the diagnostic. As such, a seal of the fuel system based on a vacuum level and a pressure level is not measured.

If the vehicle-off event is present and the vehicle is off, then at 308, the method 300 may include where a controller of the vehicle system (such as a vehicle powertrain control module or PCM) may be shifted to a sleep mode to reduce vehicle-off energy consumption by on-board sensors, auxiliary components, and diagnostics. In addition, a timer may be started.

Upon confirming the vehicle-off event, at 310, the method 300 may include determining if a threshold time has elapsed since the engine was on. Said another way, an amount of time since the vehicle-off event without an engine on event is measured and compared to the threshold time. The threshold time may be based on a fixed amount of time (e.g., 30 to 60 minutes) or may be a dynamic value based on one or more of an engine run-time, ambient temperature, vehicle temperature, and the like. For example, if the ambient temperature is high, then the threshold time may be reduced. As another example, if the engine run-time is relatively high, then the threshold time may be reduced. If the amount of time is less than the threshold time, then at 312, the method 300 may include determining if time elapsed is less than the threshold time due to an engine-on event. The engine-on event may be due to an automatic start/stop, a key-on event, a button being depressed, and the remote key being activated.

If the engine-on event is not present, then the method 300 may continue to compare the time elapsed to the threshold time elapsed. If the engine-on event is present, then at 313, the method 300 may proceed to 313, which includes restarting the timer. Restarting the timer may include setting the timer value back to zero. Additionally or alternatively, restarting the timer may be based on a duration in which the engine was on relative to a duration in which the engine was off. For example, if the duration the engine was on is relatively low, then restarting the timer may include decreasing a current timer value to a value between the current timer value and 0.

If the time elapsed since the engine is on is equal to or greater than the threshold time, then at 314, the method 300 may include waking up the controller from the sleep mode upon the threshold time being elapsed. The controller may be adjusted from the sleep mode to a wake-up mode.

At 316, the method 300 may include executing the leak test diagnostic. The leak test diagnostic is described in greater detail with respect to FIG. 4.

Turning now to FIG. 4, it shows a method 400 for executing the leak test diagnostic. At 402, the method 400 may include estimating a ground surface temperature. The ground surface temperature may be estimated based on multiple inputs including a surface material, an ambient temperature, an amount of sunlight directed to the portion of a ground surface proximal to the vehicle, and a wind flow. For example, the ground surface temperature may be hotter if the surface material is asphalt or concrete relative to dirt, grass, or other non-metal surfaces. The ground surface temperature may increase if the ambient temperature increases, the amount of sunlight increases, and the wind flow decreases. In one example, the ground surface temperature may be directly measured via a camera, such as a rear back-up camera, directed toward a ground surface behind the vehicle. The camera may include thermal imaging, in one example. Additionally or alternatively, the camera may image the surface, wherein the surface material may be determined based on the image of the surface. The ground surface temperature may then be approximated based on the surface material in combination with the ambient weather, wind flow, and sunlight.

At 404, the method 400 may include estimating a vehicle cargo weight. The vehicle cargo weight may include a cabin weight, a truck bed load weight, a tow trailer weight, and all other loads that may modify a total vehicle weight. Said another way, the controller may estimate a change in a total vehicle weight, wherein a location of the weights may be adjusted via a weight modifier. The weights may be used to determine a proximity of the vehicle to the ground surface, wherein a smaller distance between the vehicle and the ground surface may result in a lower vacuum threshold. A trailer weight may be estimated via a hitch comprising a load sensor arranged therein. The hitch may be a smart hitch in one example, further configured to sense a deflection of the vehicle with respect to the ground.

In some examples, additionally or alternatively, the vehicle cargo weight may be estimated based on a compression of a suspension system of the vehicle. The compression may be proportional to the vehicle cargo weight, wherein as the compression increases, the vehicle cargo weight may also increase.

In some examples, additionally or alternatively, the rear camera of the vehicle may estimate a distance between the vehicle and the ground surface as it images of the ground surface. The distance may be used to estimate the vehicle cargo weight.

At 406, the method 400 may include dynamically adjusting the threshold vacuum and the threshold pressure based on the ground surface temperature and the cargo weight. Thus, the thresholds may now be based on a combination of a fuel tank fill level, an air temperature, the ground surface temperature, and the vehicle cargo weight. Each of the vacuum threshold and the pressure threshold may be updated during the diagnostic as the ground surface temperature and vehicle cargo weight changes. For example, if a user is unloading items from the vehicle such that the cargo weight decreases, the vacuum threshold and the pressure threshold may be updated to reflect the lower cargo weight. Additionally or alternatively, if the ground surface temperature changes during the diagnostic, then the vacuum threshold and the pressure threshold may be updated accordingly. In some examples, the threshold vacuum and the threshold pressure may be maintained in response to one of the cargo weight being less than a threshold weight or the ground surface temperature being within a threshold difference of an ambient air temperature. For example, if the cargo weight is less than the threshold weight, then a distance between a fuel tank and the ground surface may not be decreased. In such an example, the ground surface temperature may not impact the leak diagnostic results due to the distance between the ground surface and the fuel tank being too large. As another example, if the ground surface temperature is within the threshold difference of the ambient air temperature, then an impact of the ground surface temperature on a temperature of the fuel tank may be ignored, independent of the cargo weight.

At 408, the method 400 may include closing a canister vent valve (CVV). Additionally or alternatively, a fuel tank isolation valve (FTIV) may be closed where included in the fuel system. In this way, the fuel tank may be isolated from atmosphere. The status of a canister purge valve (CPV) and/or other valves coupled within a conduit connecting the fuel tank to atmosphere may also be assessed and closed if open.

At 410, the method 400 may include executing a pressure rise test. While the engine is still cooling down post shutdown, there may be additional heat rejected to the fuel tank. With the fuel system sealed via the closing of the CVV, the pressure in the fuel tank may rise due to fuel volatizing with increased temperature. The pressure rise test may include monitoring fuel tank pressure for a period of time. Fuel tank pressure may be monitored until the pressure reaches the adjusted threshold, the adjusted threshold pressure indicative of no leaks above a threshold size in the fuel tank. In some examples, the rate of pressure change may be compared to an expected rate of pressure change. The fuel tank pressure may not reach the threshold pressure. Rather, the fuel tank pressure may be monitored for a predetermined amount of time, or an amount of time based on the current conditions. The fuel tank pressure may be monitored until consecutive measurements are within a threshold amount of each other, or until a pressure measurement is less than the previous pressure measurement. The fuel tank pressure may be monitored until the fuel tank temperature stabilizes.

At 412, the method 400 may include determining if a threshold pressure is detected. The threshold pressure is equal to the dynamically adjusted threshold based on the fill level, ground surface temperature, cargo load, and air temperature.

If the pressure rise test resulted in a passing result, method 400 proceeds to 414. At 414, method 400 may include indicating the passing test result. Indicating the passing result may include recording the successful outcome of the leak test in memory of the controller.

At 416, method 400 may include opening the CVV. In this way, the fuel system pressure may be returned to atmospheric pressure.

At 418, method 400 may include updating the evaporative emissions leak test schedule. For example, scheduled leak tests may be delayed or adjusted based on the passing test result.

Returning to 412, if a passing result is not indicated based on a comparison of the pressure rise and the adjusted threshold pressure, then at 420, method 400 may include opening the CVV and allowing the system to stabilize. Opening the CVV may allow the fuel system pressure to equilibrate to atmospheric pressure. The system may be allowed to stabilize until the fuel tank pressure reaches atmospheric pressure, and/or until consecutive pressure readings are within a threshold of each other.

At 422, the method 400 may include closing the CVV and executing the vacuum test. The fuel tank may be isolated from atmosphere via the closed CVV. As the fuel tank cools, the fuel vapors may condense into liquid fuel, creating a vacuum within the sealed tank. Executing a vacuum test may include monitoring fuel tank pressure for a duration. Fuel tank pressure may be monitored until the vacuum reaches the adjusted threshold, the adjusted threshold vacuum indicative of no leaks above a threshold size in the fuel tank. In some examples, the rate of pressure change may be compared to an expected rate of pressure change. The fuel tank pressure may not reach the threshold vacuum. Rather, the fuel tank pressure may be monitored for a predetermined duration, or a duration based on the current conditions.

At 424, the method 400 may include determining whether a passing result was indicated for the vacuum test based on the adjusted threshold vacuum.

If a passing result is indicated, method 400 proceeds to 414-418 as described above.

If the vacuum test did not result in a passing result, then at 426, the method 400 may include recording the diagnostic was not passed. Indicating the diagnostic was not passed may include recording the unsuccessful outcome of the leak test in memory of the controller.

At 428, the method 400 may include opening the CVV. In this way, the fuel system pressure may be equilibrated to atmospheric pressure.

At 430, method 400 may include indicating degradation of the fuel system. In other words, method 400 comprises indicating degradation of the fuel tank responsive to an absolute fuel tank pressure less than a threshold. Indicating fuel tank degradation may include setting a flag at the controller and activating a malfunction indicator light (MIL) to indicate the vehicle operator of the presence of fuel tank degradation.

At 432, the method 400 may include adjusting engine operating parameters. Adjusting engine operating parameters may include adjusting a maximum engine load to reduce fuel consumption, adjusting a commanded A/F ratio, operating the vehicle in battery-only mode during certain conditions, etc.

Turning now to FIG. 5, it shows a plot 500 illustrating a positive pressure threshold based on an air temperature, increasing along an x-axis, and a fuel tank fill level, increasing along a y-axis. The threshold pressure value retrieved from the plot 500 based on the air temperature and the fuel tank fill level may be modified via a modifier, $K_p$. $K_p$ may be based on a cargo weight of the vehicle, wherein $K_p$ increases as the cargo weight increases. Thus, a higher threshold pressure may be used in the diagnostic as the fuel tank is closer to the ground surface. Example values of $K_p$ are shown in Table 1 below.

TABLE 1

Example $K_p$ values based on cargo weight

| $K_p$ | 1 | 1.1 | 1.2 | 1.3 | 1.4 | 1.5 |
|---|---|---|---|---|---|---|
| Cargo weight (lbs) | 0 | 500 | 1,000 | 1,500 | 2,000 | 2,500 |

In one example, $K_p$ may only be applied to the threshold pressure in response to a ground surface temperature being greater than an ambient temperature by a threshold difference. In one example, the threshold difference is equal to 10 degrees F. The threshold difference may be adjusted in response to the fuel tank fill level and air temperature. For example, the threshold difference may increase in response to the fuel tank fill level being higher or the air temperature being lower.

Turning to FIG. 6, it shows a plot 600 illustrating a negative pressure threshold based on an air temperature, increasing along an x-axis, and a fuel tank fill level, increasing along a y-axis. The threshold vacuum value retrieved from the plot 600 based on the air temperature and the fuel tank fill level may be modified via a modifier, $K_v$. $K_v$ may be based on a cargo weight of the vehicle, wherein $K_v$ increases as the cargo weight increases. Thus, a lower vacuum threshold may be used during the diagnostic as a distance between the vehicle and the ground surface is reduced. Example values of $K_v$ are shown in Table 2 below.

TABLE 2

Example $K_v$ values based on cargo weight

| $K_v$ | 1 | 0.9 | 0.8 | 0.7 | 0.6 | 0.5 |
|---|---|---|---|---|---|---|
| Cargo weight (lbs) | 0 | 500 | 1,000 | 1,500 | 2,000 | 2,500 |

In one example, $K_v$ may only be applied to the threshold pressure in response to a ground surface temperature being greater than an ambient temperature by a threshold difference. In one example, the threshold difference is equal to 10 degrees F. The threshold difference may be adjusted in response to the fuel tank fill level and air temperature. For example, the threshold difference may increase in response to the fuel tank fill level being higher or the air temperature being lower.

As illustrated in FIGS. 5 and 6, if the cargo weight is less than a threshold weight (e.g., 500 lbs) and a vehicle weight is substantially equal to a gross vehicle weight, then the ground surface temperature may be ignored. As another example, if the ground surface temperature is within a threshold difference of an ambient air temperature, then the cargo weight may be ignored.

In one real-world example, the ground surface temperature is relatively hot and greater than the ambient air temperature by at least the threshold difference. The cargo weight may be equal to 2,500 lbs to start the diagnostic. During the diagnostic, the user may begin to unload items in the vehicle, thereby decreasing the cargo weight. In one example, the cargo weight is reduced to 1,000 lbs. Thus, the threshold pressure is reduced during the diagnostic based on a difference between the $K_p$ values associated with 2,500 lbs and 1,000 lbs cargo weight.

In another real-world example, the cargo weight is equal to 1,500 lbs and the ground surface temperature is relatively hot and greater than the ambient air temperature by at least the threshold difference. The threshold vacuum may be adjusted to a first adjusted threshold vacuum to start the diagnostic. As the diagnostic progresses, the ground surface temperature may decrease due to reduced sunlight, water flowing thereon, or the like. The ground surface temperature is now within the ambient air temperature by the threshold difference. As such, the threshold vacuum may be reverted to the threshold vacuum retrieved from the plot 600.

Turning now to FIG. 7, it shows a plot 700 illustrating various conditions during a diagnostic executed at an engine-off, wherein the diagnostic includes a pressure-rise and a vacuum test of a fuel system. Plot 702 illustrates a fuel system pressure. Dashed line 704 illustrates an unadjusted threshold pressure and dashed line 705 illustrates an unadjusted threshold vacuum. Dashed line 706 illustrates an adjusted threshold pressure and dashed line 707 illustrates an adjusted threshold vacuum. Plot 710 illustrates a ground surface temperature. Plot 720 illustrates a cargo weight. Plot 730 illustrates a pressure rise test result. Plot 740 illustrates a vacuum test result. Time increases from a left to a right side of the figure.

Prior to t1, the pressure of the exhaust system is equal to a stable pressure (plot 702 and dashed line 703, respectively). In one example, the exhaust system is not sealed (e.g., open to atmosphere). The ground temperature is relatively high (plot 710). The cargo weight is relatively high (plot 720). As such, a distance of the fuel tank to the ground surface may be less than when the cargo weight is lower. As such, an adjusted threshold pressure (dashed line 706) and an adjusted threshold vacuum (dashed line 707) are generated relative to a threshold pressure (dashed line 704) and a threshold vacuum (dashed line 705), respectively.

At t1, the fuel system is sealed and the pressure begins to increase. Between t1 and t2, the fuel system pressure does not reach the adjusted threshold pressure. At t2, the pressure test result is a fail. Between t2 and t3, the exhaust system pressure returns to the stable pressure. At t3, the pressure in the fuel system decreases as vacuum develops. Between t3 and t4, the cargo weight decreases as the vacuum test is being executed. As such, the distance between the fuel tank and the ground surface increases. As a result, the adjusted vacuum threshold increases to reflect the reduced effect of the hot ground surface. At t4, the adjusted threshold vacuum is equal to the threshold vacuum. The fuel system vacuum is equal to the threshold vacuum between t4 and t5. At t5 and after, the vacuum test result is passed. Thus, the diagnostic is passed and recorded in memory.

In this way, the fuel system leak diagnostic results may be enhanced by dynamically compensating for the pressure and vacuum thresholds to a distance between the ground surface and the fuel tank. Onboard scales may allow improved approximations of the fuel tank proximity to the ground surface. The technical effect of accounting for the fuel tank proximity to the ground surface based on a cargo weight of the vehicle is to enhance an accuracy of the EONV diagnostic to reduce to a number of false passes and false fails.

The disclosure provides support for a method including adjusting a threshold of a diagnostic based on an inferred distance between a fuel tank and a ground surface. A first example of the method further includes where the diagnostic is a fuel system leak diagnostic. A second example of the method, optionally including the first example, further includes where the inferred distance is based on a cargo weight of a vehicle in which the fuel tank is arranged, the cargo weight sensed via an onboard vehicle weight sensor. A third example of the method, optionally including one or more of the previous examples, further includes where maintaining the threshold in response to a temperature of the ground surface being with a threshold difference of an ambient air temperature. A fourth example of the method, optionally including one or more of the previous examples, further includes where the threshold is a pressure threshold or a vacuum threshold.

The disclosure further provides support for a system including a vehicle comprising a fuel tank, a vehicle weight sensor, and a controller comprising computer-readable instructions stored on non-transitory memory thereof that when executed cause the controller to adjust a threshold pressure and a threshold vacuum of a fuel system leak diagnostic based on a vehicle weight and a ground surface temperature. A first example of the system further includes where the vehicle weight is based on a cargo load, a cabin load, and a trailer load, and wherein the trailer load is estimated based on a load sensor coupled to a hitch. A second example of the system, optionally including the first example, further includes where the instructions further enable the controller to maintain the threshold pressure and the threshold vacuum in response to the ground surface temperature being within a threshold difference of an ambient air temperature independent of the vehicle weight. A third example of the system, optionally including one or more of the previous examples, further includes where instructions further enable the controller to adjust the threshold pressure and the threshold vacuum prior to and during the fuel system leak diagnostic. A fourth example of the system, optionally including one or more of the previous examples, further includes where the ground surface temperature is measured via a rear camera of the vehicle. A fifth example of the system, optionally including one or more of the previous examples, further includes where the ground surface temperature is estimated based on a ground surface material, the ground surface material determined based on a ground surface imaging provided via a rear camera of the vehicle. A sixth example of the system, optionally including one or more of the previous examples, further includes where the instructions enable the controller to increase the threshold pressure in response to the vehicle weight increasing. A seventh example of the system, optionally including one or more of the previous examples, further includes where the instructions enable the controller to decrease the threshold vacuum in response to the vehicle weight increasing. An eighth example of the system, optionally including one or more of the previous examples, further includes where the instructions enable the controller to maintain the threshold pressure and the threshold vacuum in response to the vehicle weight being less than a threshold weight independent of the ground surface temperature. A ninth example of the system, optionally including one or more of the previous examples, further includes where the vehicle weight is proportional to a distance between the vehicle and the ground surface, and wherein the instructions enable the controller to adjust the threshold pressure and the threshold vacuum based on the distance and the ground surface temperature being greater than a threshold, wherein the threshold is based on a difference between the ground surface temperature and an ambient air temperature.

The disclosure further provides support for a method for a fuel system leak diagnostic, the method includes adjusting a threshold pressure and a threshold vacuum based on a vehicle weight and a ground surface temperature, and maintaining the threshold pressure and the threshold vacuum based on the vehicle weight being less than a threshold weight or the ground surface temperature being within a threshold difference of an ambient air temperature. A first example of the method further includes where the adjusting occurs prior to and during the fuel system leak diagnostic. A second example of the method, optionally including the first example, further includes increasing the threshold pressure and decreasing the threshold vacuum in response to the vehicle weight being greater than the threshold weight and the ground surface temperature being greater than the ambient air temperature by at least the threshold difference. A third example of the method, optionally including one or more of the previous examples, further includes where the ground surface temperature is based on at least a ground surface material. A fourth example of the method, optionally including one or more of the previous examples, further includes indicating a result of the fuel system leak diagnostic based on a comparison of a sensed pressure to the adjusted threshold pressure of a sensed vacuum to the adjusted threshold vacuum.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a vehicle comprising a fuel tank;
a vehicle weight sensor for obtaining a vehicle weight;
an ambient air temperature sensor for obtaining an ambient air temperature;
a ground surface temperature sensor for obtaining a ground surface temperature; and
a controller comprising computer-readable instructions stored on non-transitory memory thereof that when executed cause the controller to:
adjust a threshold pressure and a threshold vacuum of a fuel system leak diagnostic based on the vehicle weight and the ground surface temperature,
maintaining the threshold pressure and the threshold vacuum based on the vehicle weight being less than the threshold weight or the ground surface temperature being within a threshold difference of the ambient air temperature.

2. The system of claim 1, wherein the vehicle weight is based on a cargo load, a cabin load, and a trailer load, and wherein the trailer load is estimated based on a load sensor coupled to a hitch.

3. The system of claim 1, wherein the instructions further enable the controller to maintain the threshold pressure and the threshold vacuum in response to the ground surface temperature being within a threshold difference of an ambient air temperature independent of the vehicle weight.

4. The system of claim 1, wherein the instructions further enable the controller to adjust the threshold pressure and the threshold vacuum prior to and during the fuel system leak diagnostic.

5. The system of claim 1, wherein the ground surface temperature is measured via a rear camera of the vehicle.

6. The system of claim 1, wherein the ground surface temperature is estimated based on a ground surface material, the ground surface material determined based on a ground surface imaging provided via a rear camera of the vehicle, wherein the ground surface temperature sensor comprises the rear camera.

7. The system of claim 1, wherein the instructions enable the controller to increase the threshold pressure in response to the vehicle weight increasing.

8. The system of claim 1, wherein the instructions enable the controller to decrease the threshold vacuum in response to the vehicle weight increasing.

9. The system of claim 1, wherein the instructions enable the controller to maintain the threshold pressure and the threshold vacuum in response to the vehicle weight being less than a threshold weight independent of the ground surface temperature.

10. The system of claim 1, wherein the vehicle weight is proportional to a distance between the vehicle and a ground surface, and wherein the instructions enable the controller to adjust the threshold pressure and the threshold vacuum based on the distance and the ground surface temperature being greater than a threshold, wherein the threshold is based on a difference between the ground surface temperature and an ambient air temperature.

11. A method for a fuel system leak diagnostic, the method comprising:
obtaining a vehicle weight based on an input from a first sensor;
obtaining a ground surface temperature based on an input from a second sensor;
obtaining an ambient air temperature based on an input from a third sensor;
compensating for an effect of the ground surface temperature on the fuel system leak diagnostic by adjusting a threshold pressure and a threshold vacuum based on the vehicle weight and the ground surface temperature;
maintaining the threshold pressure and the threshold vacuum based on the vehicle weight being less than a threshold weight or the ground surface temperature being within a threshold difference of the ambient air temperature;
performing the fuel system leak diagnostic by:
measuring a pressure in the fuel system during a first time period and comparing the pressure with the adjusted threshold pressure; and
measuring a vacuum in the fuel system after the first time period has elapsed, and comparing the vacuum with the adjusted threshold vacuum; and
based on a result of the fuel system leak diagnostic, opening a valve and/or performing one or more of: adjusting a maximum engine load to reduce fuel consumption, adjusting a commanded A/F ratio, and operating the vehicle in battery-only mode during certain conditions.

12. The method of claim 11, wherein the adjusting occurs prior to and during the fuel system leak diagnostic.

13. The method of claim 11, further comprising increasing the threshold pressure and decreasing the threshold vacuum in response to the vehicle weight being greater than the threshold weight and the ground surface temperature being greater than the ambient air temperature by at least the threshold difference.

14. The method of claim 11, wherein the ground surface temperature is based on at least a ground surface material.

15. The method of claim 11, further comprising indicating a result of the fuel system leak diagnostic based on a comparison of a sensed pressure to the adjusted threshold pressure of a sensed vacuum to the adjusted threshold vacuum.

* * * * *